United States Patent [19]
Bonkoske

[11] 3,952,697
[45] Apr. 27, 1976

[54] SPOT-COATING APPARATUS
[75] Inventor: Gerry L. Bonkoske, Skokie, Ill.
[73] Assignee: Teletype Corporation, Skokie, Ill.
[22] Filed: Oct. 16, 1974
[21] Appl. No.: 515,389

[52] U.S. Cl. ............................................. 118/263
[51] Int. Cl.² ........................................ B05C 1/02
[58] Field of Search .................. 118/243, 263, 421; 427/97

[56] References Cited
UNITED STATES PATENTS

| | | | |
|---|---|---|---|
| 2,455,129 | 11/1948 | Lepperhoff ................. | 118/243 UX |
| 3,776,184 | 12/1973 | Harrison ............................ | 118/243 |
| 3,785,341 | 1/1974 | Blewett et al. ................... | 118/243 X |

Primary Examiner—Morris Kaplan
Attorney, Agent, or Firm—W. K. Serp; J. L. Landis

[57] ABSTRACT

A quantity of solder cream is contained in a rotatably supported receptacle. An elongated dispensing spindle is rotated slowly about its axis and introduced into the solder cream. Upon removal from the receptacle, a swirl of solder cream adheres to the end of the spindle and is transported on the spindle to the desired workpiece. The solder cream swirl is brought into contact with the workpiece thereby depositing a controlled amount of solder cream at the selected location. Means reposition the receptacle before reintroduction of the spindle into the solder cream.

6 Claims, 4 Drawing Figures

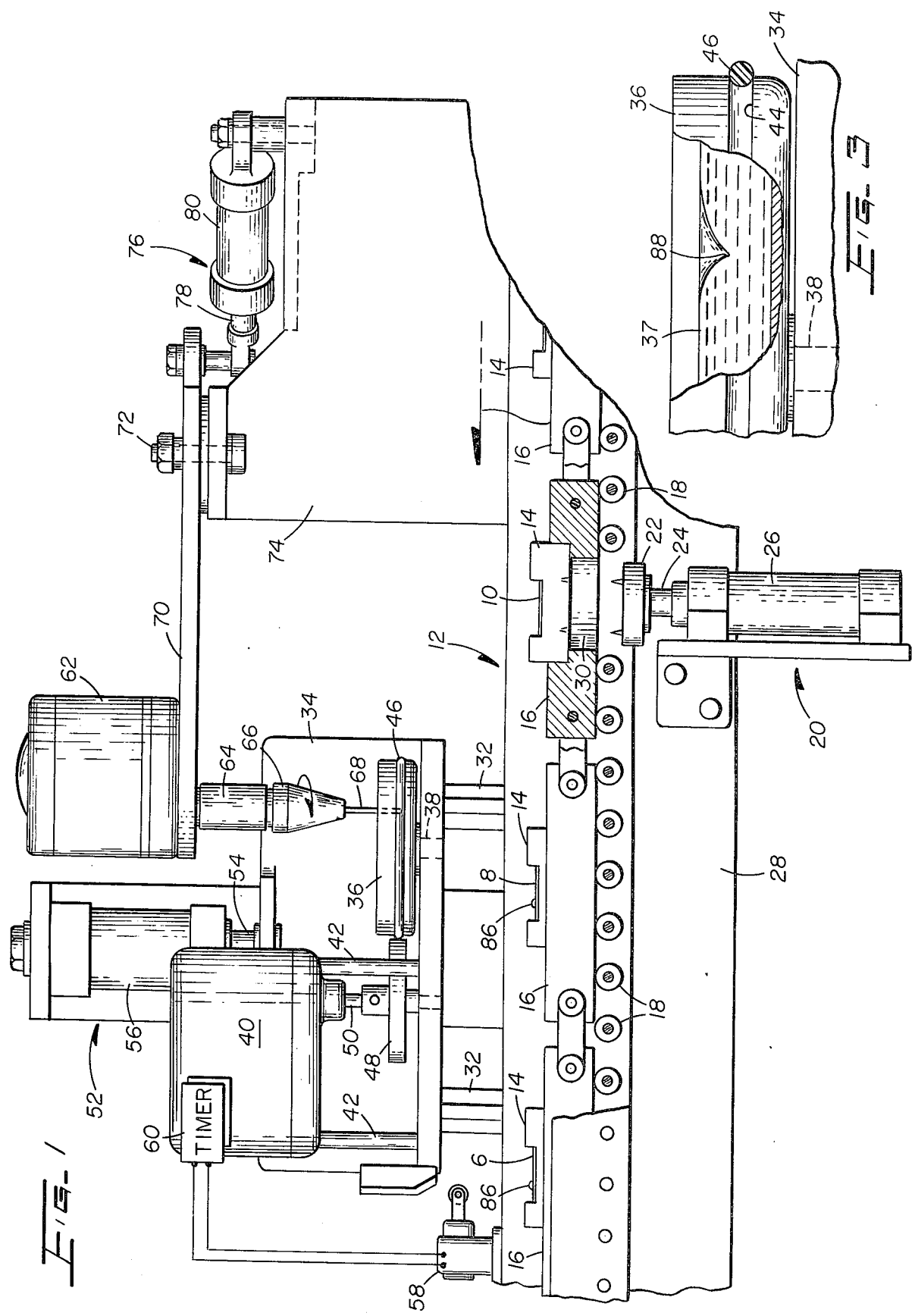

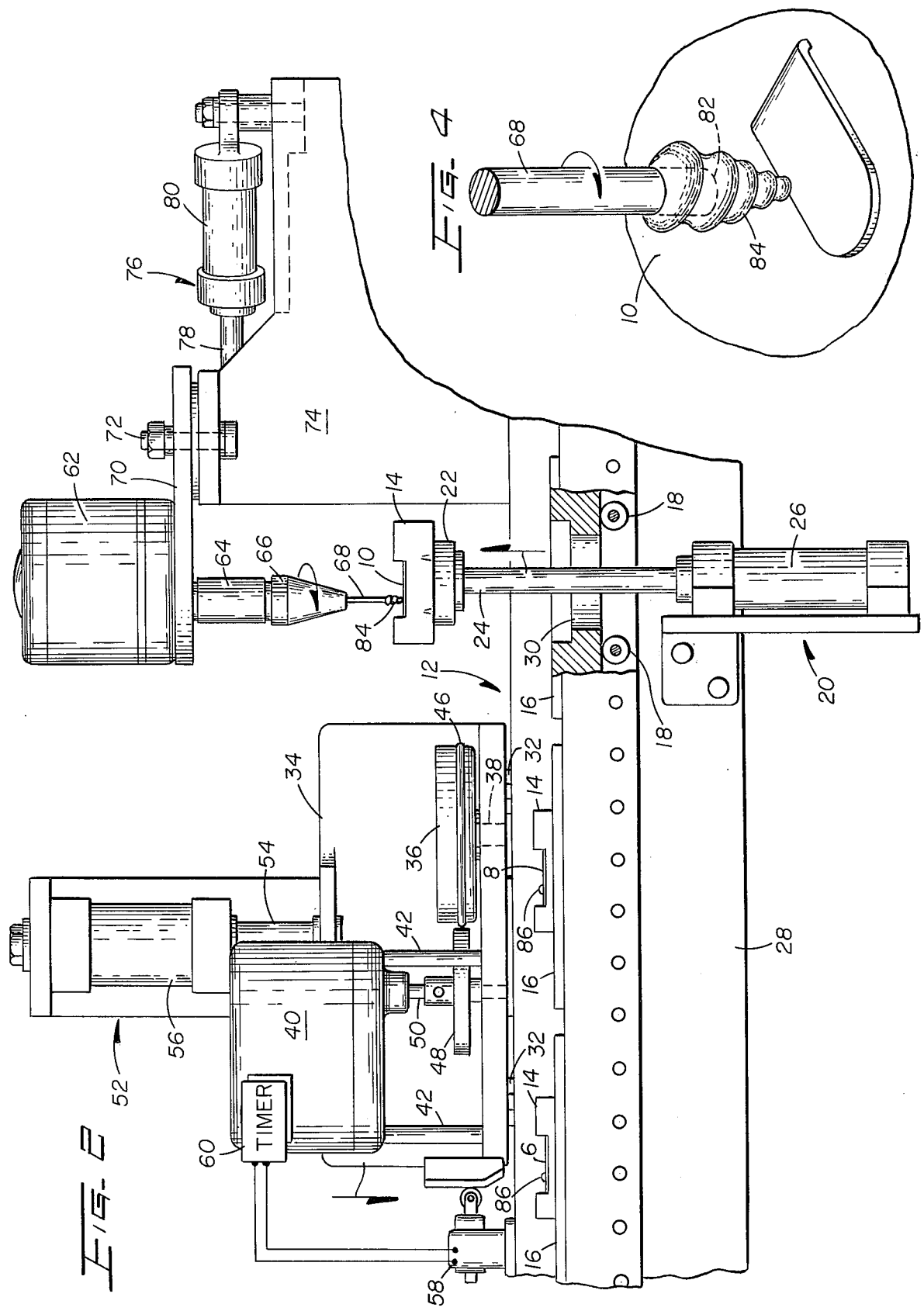

SPOT-COATING APPARATUS

This invention generally relates to apparatus for dispensing solder cream and more particularly relates to apparatus for depositing a small quantity of solder cream at a precise location on a selected workpiece; the apparatus and method being particularly suited to assembly line implementation.

The revolution of the electronics industry toward minaturization has generated certain highly developed techniques especially in the area of automated assembly of minature products. Particular difficulty has previously been experienced in soldering the various components comprising a highly complex assembly. Production wave soldering has found wide application for soldering individual components to a printed circuit substrate. However, this approach subjects the board as well as the components carried thereon to relatively high temperatures and further demands that at least one side of the board be wetted by the solder bath. Certain component assemblies do not lend themselves to such physical treatment. As an alternative, solder cream has been frequently applied to the connection and at a subsequent assembly station, localized heat is applied to complete the connection.

Various arrangements have been suggested for applying the solder cream to the connection such as hopper dispensing, spraying, and roller transfer. However, each of these systems, when applied to automated production techniques, requires considerable maintenance and clean-up when the line is shut down or interrupted at the end of a work day. Further, in extremely confined areas, it is difficult to direct the solder cream to a precise location under present automatic assembly techniques. The subsequent disclosure describes an apparatus which is capable of dispensing a controlled amount of solder cream to a restricted area in a repetitive manner. Such an operation is accomplished with a minimum of components thereby facilitating clean-up and maintenance of the apparatus in the event of interruption or shut down.

SUMMARY OF THE INVENTION

The illustrated embodiment includes an elongated member which is slowly rotated about its axis. A receptacle filled with a quantity of solder cream is positioned to receive the rotating member. Means are disclosed for selectively positioning one end of the member into the solder cream and thereafter locating the member with respect to the workpiece so that the solder cream adhering to the member is deposited at a selected location on the workpiece. Additionally, means are described for positioning the receptacle so that the member is introduced into adjacent portions of the cream on successive insertions.

It is a main object of this invention to provide an apparatus for dispensing a predetermined quantity of solder cream to a selected position on a workpiece. Other objects, advantages, and features of the invention will be more readily appreciated after reference to the following description and accompanying drawings.

DESCRIPTION OF THE DRAWINGS

FIG. 1 illustrates an apparatus for dispensing solder cream including certain features of this invention in a first operational position;

FIG. 2, an illustrative of the apparatus of FIG. 1, wherein certain components thereof are in a second operational position;

FIG. 3 is a partially sectionalized fragmentary view of a component of the apparatus illustrated in FIG. 1; and FIG. 4 is an enlarged fragmentary view of a component of the apparatus of FIG. 2 illustrating certain operational features thereof.

DETAILED DESCRIPTION

General

With particular reference to FIG. 1, a stream of workpieces 6, 8, and 10 are carried on a continuous conveyer 12 in suitable carriers 14 provided therefor. Each of the carriers 14 are removably contained in a respective carriage 16. The carriages 16 are link coupled and moved along a conveyer track 18 by means of a motor drive, (not shown) not forming a part of this invention. Serving to position a selected workpiece 10 for application of solder cream is a solenoid actuator 20. A lift platform 22 is mounted on the end of a plunger 24, of the actuator 20, which is coaxially positioned within an electromagnetic coil 26 mounted to a frame 28 of the conveyer 12. The carriage 16 defines an opening 30 sufficiently large to clear the platform 22 so that when the solenoid 20 is energized, the platform 22 will pass through the carriage 16 raising the workpiece 10 and workpiece carrier 14 to the position illustrated in FIG. 2. In this manner, the workpiece 10, maintained within the carrier 14, is positioned for the application of solder cream as will hereinafter be further described. Positioned proximate the conveyer 12 on a suitable track 32 provided therefor is a housing 34 upon which is mounted a solder cream receptacle 36 having a quantity of solder cream 37 stored therein. The longitudinal axis of the tracks 32 carrying the housing 34 are vertically oriented with respect to the path of the conveyer 12.

The cream receptacle 36 is in the form of a relatively flat open cup (FIG. 3) which is pivotably supported on a support shaft 38 journalled in the base of the housing 34 for rotation by means of a receptacle drive motor 40. The motor 40 is supported on the housing 34 by means of cylindrical motor supports 42. Positioned about the outer circumference of the receptacle 36 in a circumferential groove 44 is a resilient elongated elastic band 46 defining substantially a circle in cross-section. Serving to drivingly engage the band 46 positioned about the receptacle 36 is a drive wheel 48, the circumferential surface of which is in frictional driving contact with the band 46. The hub of the wheel 48 is secured to a drive shaft 50 of the receptacle drive motor 40.

Vertically positioning the receptacle housing 34 and the components carried therein with respect to the conveyer 12 along the parallel tracks 32 is a housing solenoid 52 which includes a plunger 54, the lower end of which is secured to the housing 34. The plunger 54 is coaxially positioned within a coil housing 56 mounted in fixed relation to the conveyer 12. When the coil is energized, the plunger 54 pulls the receptacle housing 34 upwardly along the tracks 32 to the position of FIG. 1 and upon de-energization the force of gravity draws the housing 34 to the position of FIG. 2. Additionally, located adjacent to the housing 34, for actuation thereby, is a timer switch 58 which actuates a motor timer 60 controlling the period of energization of the receptacle motor 40. In this manner, the motor 40 is energized for a fixed time period thereby imparting a predetermined rotational incremental movement to the receptacle 36 in response to movement of the housing 34 to the position of FIG. 2. Thus, upon de-energization of the solenoid 52, the housing 34 drops from the position illustrated in FIG. 1 to the position illustrated in FIG. 2. The switch 58 is actuated which then triggers the timer 60, in turn, energizing the motor 40 for a brief period causing the solder cream receptacle 36 to incrementally rotate at a relatively slow speed.

Extracting a predetermined amount of solder cream from the receptacle 36 and transporting it to the desired location upon the workpiece 10 carried on the cradle 14, is a solder cream dispensing means which includes a low speed spindle drive motor 62 having a drive shaft 64. The motor drive shaft 64 carries an adjustable chuck 66 at one end detachably securing one end of an elongated solder cream dispensing spindle 68. The drive motor 62 is mounted to one end of a motor support arm 70, which is pivotably supported by means of a pivot pin 72 upon a spindle motor, drive arm support bracket 74 secured to the conveyer frame 28. Serving to impart pivotal movement to the arm 70 about the pin 72 is an electromagnetic, dual wound solenoid 76. The plunger 78 of the solenoid 76 is secured to the end of the motor support arm 70 opposite the end supporting the motor 62 thus forming a motor positioning mechanism. The plunger 78 is coaxially positioned in a double wound solenoid 80 which is pivotally secured to the bracket 74. Thus, when one of the windings of the solenoid 80 is energized the plunger 78 will be retracted, drawing the arm to the position of FIG. 1 with the spindle 68 positioned over the solder receptacle 36. In the extended position of the plunger 78, the spindle 68 is positioned to a location over the workpiece 10 as illustrated in FIG. 2.

It has been found that a spindle 68 having an elongated shape and displaying substantially a circular cross-section is most suitable for the dispensing of solder cream. It has been further determined through experimentation that a spindle 68 having a blunted end as at 82 rather than a pointed or tapered end is most satisfactory in that a blunted spindle end supports a particularly uniform quantity of solder cream from one sampling to the next. However, it should be appreciated that other shapes will be also suitable and therefore the invention is not intended to be limited to the particular shape and configuration of the spindle 68 illustrated in FIG. 4.

In use, the crank arm solenoid 76 is actuated, retracting the plunger 78 into the solenoid coil 80 thereby rotating the spindle motor support arm 70 about the pivot pin 72 so that the spindle 68 is positioned over the solder cream receptacle 36. The housing solenoid 52 is energized and the housing raised to the position of FIG. 1 so that the rotating spindle 68 is introduced into the solder cream 37 contained within the receptacle 36. Various types of solder cream may be utilized with this invention. Such solder cream include solder particles suspended in a flux base having organic or inorganic activators. A particular solder cream found to be suitable is sold by Alpha Metals Incorporated of Jersey City, N.J. and sold under the tradename RELIA-CREAMS. This solder cream has a viscosity of approximately 380,000 centipoise.

The spindle motor 62 is continuously energized so that it rotates at a very slow rotational speed. The housing solenoid 52 is energized for a short period of time and upon de-energization, the housing falls to the position of FIG. 2 thus removing the rotating spindles 68 from the solder cream 37. A quantity of cream will adhere to the spindle 68 and generally assume the shape of a swirl 84 as illustrated in FIG. 4. A suitable rotational speed for the spindle 68 has been found to be between 50 rpm and 200 rpm. This particular range allows a uniform swirl 84 to be formed for each insertion of the spindle 68 into the cream and is sufficiently slow to prevent cream from being thrown from the spindle by the centrifical forces generated. Upon removal of the cream receptacle 36 from the spindle 68, the solenoid 76 is energized so that the plunger 78 is forced out of the solenoid housing 80 thus rotating the arm 70 carrying the spindle motor 62 to the position of FIG. 2. Once the spindle 68 has reached the position of FIG. 2, the carriage solenoid 20 is energized forcing the plunger 24 upwardly and moving the workpiece 10 to the position of FIG. 2 and into contact with the swirl 84 carried on the end of the spindle 68. Upon contact, the swirl 84 carried on the end of the spindle 68, the solder cream is deposited on the workpiece. It has been found that the cream, when deposited on the workpiece, forms a well-defined pool as at 86 which permits very accurate placement of small uniformly controlled quantities of solder cream at selected locations.

As illustrated in FIG. 3, solder cream is relatively viscous and requires a relatively large amount of time to fill the crater 88 created by the previous cream removal. As previously mentioned, when the housing solenoid 52 is de-energized, the housing 34 falls to the position illustrated in FIG. 2 and the timer 60 is actuated causing the motor 40 to momentarily energize thereby incrementally rotating the cream receptacle 36. After rotation, a fresh portion of the cream 37 carried in the receptacle 36 is positioned for receipt of the spindle 68 during the next operational cycle and the previously formed crater allowed to slowly fill.

An improved method and apparatus has been described for dispensing a premeasured quantity of solder cream at a selected location. Although the invention has been particularly shown and described with reference to a preferred embodiment thereof, it will be understood that various changes in form and detail may be made without departing from the spirit and scope of the invention.

What is claimed is:

1. An apparatus for dispensing a controlled quantity of solder cream on a workpiece at a predetermined location comprising:
   a support for a said workpiece;
   an elongated member having a rotational axis;
   means coupled to said member for slowly rotating said member about said axis;
   a container having a continuous surface defining an open cavity for retaining a stored amount of the solder cream;
   means for selectively positioning one end of said elongated member from a first position in surface contact with the solder cream contained within said container to a second position removed from said container whereat the solder cream adhering to said elongated member is in contact with the workpiece thereby depositing a predetermined quantity of the solder cream upon the workpiece;
   means for repositioning said one end of the elongated member in surface contact with the solder cream;

and means for repositioning said container after removal of said elongated member from the solder cream so that said elongated member when reintroduced into the solder cream encounters adjacent portions of the solder cream at each successive insertion thereby assuring that a controlled quantity of solder cream will adhere to said elongated member upon removal therefrom.

2. The apparatus of claim 1 wherein said container is pivotally supported and said positioning means includes indexing means coupled to the outer surface of said container for incrementally rotating the container intermediate each successive introduction of the elongated member into the solder cream contained therein.

3. The apparatus of claim 2 wherein said elongated member is rotated at a speed such that a solder cream swirl is developed on the end of said elongated member as it is removed from the solder cream within said container.

4. The apparatus of claim 3 wherein said elongated member is in the shape of a cylindrical rod and further wherein the end of the rod introduced into the solder cream is blunted to enhance the development of a solder cream swirl thereon as the rod is removed from the solder cream within said container.

5. The apparatus of claim 1 wherein said elongated member is rotated at a speed such that a solder cream swirl is developed at the end of said elongated member as it is removed from the solder cream within said container.

6. The apparatus of claim 5 wherein said elongated member is in the shape of a cylindrical rod and further wherein the end of the rod introduced into the solder cream is blunted to enhance the development of a solder cream swirl thereon as the rod is removed from the solder cream within said container.

* * * * *